(12) United States Patent
Zhang et al.

(10) Patent No.: US 12,160,837 B2
(45) Date of Patent: Dec. 3, 2024

(54) METHODS, APPARATUS AND SYSTEMS FOR DETERMINING A POWER HEADROOM FOR AN UPLINK TRANSMISSION

(71) Applicant: ZTE Corporation, Shenzhen (CN)

(72) Inventors: Chenchen Zhang, Shenzhen (CN); Peng Hao, Shenzhen (CN); Xingguang Wei, Shenzhen (CN); Yu Ngok Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 275 days.

(21) Appl. No.: 17/592,964

(22) Filed: Feb. 4, 2022

(65) Prior Publication Data

US 2022/0232489 A1 Jul. 21, 2022

Related U.S. Application Data

(63) Continuation of application No. PCT/CN2019/099591, filed on Aug. 7, 2019.

(51) Int. Cl.
*H04W 52/36* (2009.01)

(52) U.S. Cl.
CPC ................................ *H04W 52/365* (2013.01)

(58) Field of Classification Search
CPC . H04W 52/365; H04W 52/367; H04W 52/34; H04W 72/21; H04W 52/146; H04W 88/02; H04W 24/10; H04W 88/08; H04W 72/0473; H04W 52/54; H04W 88/06; H04W 52/545; H04W 72/23; H04W 52/346; H04W 52/228; H04W 52/04; H04W 72/0453; H04W 52/242; H04W 52/243; H04W 52/288; H04W 52/30;
(Continued)

(56) References Cited

U.S. PATENT DOCUMENTS 9,516,610 B2 12/2016 Bostrom et al.
11,924,779 B2 * 3/2024 Liu ..................... H04W 52/365
(Continued)

FOREIGN PATENT DOCUMENTS

WO  WO 2012/019566 A1  2/2012
WO  WO 2019/013584 A1  1/2019

OTHER PUBLICATIONS

European Search Report for Application No. 19940715.6 dated Apr. 5, 2023 (12 pages).
(Continued)

*Primary Examiner* — Golam Sorowar
(74) *Attorney, Agent, or Firm* — Crowell & Moring LLP

(57) ABSTRACT

Methods, apparatus and systems for determining a power headroom for an uplink transmission are disclosed. In one embodiment, a method performed by a wireless communication device is disclosed. The method comprises: determining a configuration of at least one power control parameter from a plurality of candidate configurations; determining, based on the configuration of the at least one power control parameter, a power headroom report (PHR) associated with an uplink transmission from the wireless communication device to a wireless communication node; and generating a power headroom report (PHR) medium access control (MAC) control element (CE) for reporting the PHR to the wireless communication node.

16 Claims, 12 Drawing Sheets

100

(58) Field of Classification Search
CPC ............... H04W 52/325; H04W 52/36; H04W 72/1268; H04W 72/20; H04L 5/001; H04L 5/0053; H04L 5/006; H04L 5/0066; H04L 1/1812; H04L 5/0007; H04L 5/0037; H04L 1/1614; H04L 5/0048; H04L 5/0032; H04L 5/0091; H04L 5/0094; H04L 67/01; H04L 67/02; H04L 67/10

See application file for complete search history.

(56) References Cited

U.S. PATENT DOCUMENTS

| | | |
|---|---|---|
| 2018/0234927 A1 | 8/2018 | Aiba et al. |
| 2018/0242264 A1 | 8/2018 | Pelletier et al. |
| 2019/0082399 A1 | 3/2019 | Loehr |
| 2019/0223116 A1 | 7/2019 | Chen et al. |
| 2019/0223117 A1 | 7/2019 | Chai et al. |
| 2021/0037481 A1* | 2/2021 | Kim ...................... H04W 72/54 |
| 2023/0141880 A1* | 5/2023 | Fu ....................... H04W 52/242 |

OTHER PUBLICATIONS

Ericsson, "Power headroom reporting in NR", 3GPP TSG-RAN WG2 #99bis, R2-1711182, Oct. 8, 2017 (12 pages).
Vivo, Clarification on the SUL PHR reporting, 3GPP TSG-RAN WG2 Meeting #, R2-1713002, Nov. 17, 2017 (8 pages).
Indian Examination Report for Application No. 202217012077 dated Oct. 10, 2022, including English translation (5 pages).
Chinese First Office Action for Application No. 201980098891 dated Apr. 29, 2023, including English translation (14 pages).
International Search Report and Written Opinion in English language for Application No. PCT/CN2019/099591 mailed Apr. 24, 2020 (7 pages).

* cited by examiner

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) | | | | | |
| R | PCPI | $P_{CMAX,f,c}$ 1 | | | | | |
| P | V | PH (Type 1, PCell) | | | | | |
| R | PCPI | $P_{CMAX,f,c}$ 2 | | | | | |
| P | V | PH (Type X, Serving Cell 1) | | | | | |
| R | PCPI | $P_{CMAX,f,c}$ 3 | | | | | |
| P | V | PH (Type X, Serving Cell n) | | | | | |
| R | PCPI | $P_{CMAX,f,c}$ m | | | | | |

900 — (table)
910 — PH (Type 1, PCell)
912 — P

FIG. 9

| | | | | | | | |
|---|---|---|---|---|---|---|---|
| $C_7$ | $C_6$ | $C_5$ | $C_4$ | $C_3$ | $C_2$ | $C_1$ | R |
| P | V | \multicolumn{6}{c|}{PH (Type 2, SpCell of the other MAC entity)} |
| PCPI | PCPI | \multicolumn{6}{c|}{$P_{CMAX,f,c}$ 1} |
| P | V | \multicolumn{6}{c|}{1010 — PH (Type 1, PCell)} |
| PCPI | PCPI | \multicolumn{6}{c|}{$P_{CMAX,f,c}$ 2} |
| P | V | \multicolumn{6}{c|}{PH (Type X, Serving Cell 1)} |
| PCPI | PCPI | \multicolumn{6}{c|}{$P_{CMAX,f,c}$ 3} |

1000 (table reference)
1013, 1014 (PCPI labels)

...

| | | |
|---|---|---|
| P | V | PH (Type X, Serving Cell n) |
| PCPI | PCPI | $P_{CMAX,f,c}$ m |

FIG. 10

METHODS, APPARATUS AND SYSTEMS FOR DETERMINING A POWER HEADROOM FOR AN UPLINK TRANSMISSION

CROSS-REFERENCE TO RELATED APPLICATION

The present application is related to PCT International Patent Application No. PCT/CN2019/099597, entitled "METHODS, APPARATUS AND SYSTEMS FOR REPORTING A POWER HEADROOM FOR AN UPLINK TRANSMISSION," filed on Aug. 7, 2019, which is expressly incorporated by reference herein in its entirety.

TECHNICAL FIELD

The disclosure relates generally to wireless communications and, more particularly, to methods, apparatus and systems for determining a power headroom for an uplink transmission in a wireless communication.

BACKGROUND

In a wireless network, in order for a base station (BS) to understand a terminal's uplink power usage more accurately, a Power Headroom Report (PHR) mechanism is supported. That is, according to a configuration of the base station, the terminal will report the power headroom (PH) or report both the PH and the maximum transmission power (Pcmax), when a certain trigger condition is met.

In a fifth-generation (5G) new radio (NR) system or a subsequent evolution system, multiple application types may be supported. For different application scenarios, the requirements for the PHR mechanism may be different. For example, an ultra-reliable low latency communications (URLLC) scenario may need a more accurate and timely PHR trigger mechanism, because of its higher reliability requirement. An enhanced mobile broadband (eMBB) scenario does not require a very high reliability, and may not require a PHR triggering mechanism that is too frequent. Different application scenarios may have different power control parameter ranges. A PH is calculated based on the power control parameters. Existing methods of calculating PH have not taken into account a situation when a same terminal supports different application scenarios.

Thus, existing systems and methods for determining a power headroom for an uplink transmission in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: determining a configuration of at least one power control parameter from a plurality of candidate configurations; determining, based on the configuration of the at least one power control parameter, a power headroom (PH) associated with an uplink transmission from the wireless communication device to a wireless communication node; and generating a power headroom report (PHR) medium access control (MAC) control element (CE) for reporting the PH to the wireless communication node. The uplink transmission may be either an actual transmission or a reference format as a virtual transmission.

In another embodiment, a method performed by a wireless communication device is disclosed. The method comprises: determining a configuration of at least one power control parameter; determining, based on the configuration of the at least one power control parameter, a power headroom (PH) associated with an uplink transmission from the wireless communication device to a wireless communication node; and determining whether to transmit an entirety of a power headroom report (PHR) medium access control (MAC) control element (CE) for reporting the PH to the wireless communication node. The uplink transmission may be either an actual transmission or a reference format as a virtual transmission.

In a further embodiment, a method performed by a wireless communication node is disclosed. The method comprises: determining a plurality of candidate configurations for at least one power control parameter for a wireless communication device; and receiving, from the wireless communication device, a power headroom report (PHR) medium access control (MAC) control element (CE) comprising a report of a power headroom (PH) associated with an uplink transmission from the wireless communication device. The PH is determined based on a configuration among the plurality of candidate configurations. The uplink transmission may be either an actual transmission or a reference format as a virtual transmission.

In a different embodiment, a method performed by a wireless communication node is disclosed. The method comprises: determining a plurality of candidate configurations for at least one power control parameter for a wireless communication device; and configuring at least one condition for the wireless communication device to determine whether to transmit an entirety of a power headroom report (PHR) medium access control (MAC) control element (CE) to the wireless communication node. The PHR MAC CE comprises a report of a power headroom (PH) associated with an uplink transmission from the wireless communication device. The PH is determined based on a configuration among the plurality of candidate configurations. The uplink transmission may be either an actual transmission or a reference format as a virtual transmission.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed.

The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 9 illustrates another exemplary structure of a multiple entry control element for reporting a power headroom, in accordance with some embodiments of the present disclosure.

FIG. 10 illustrates yet another exemplary structure of a multiple entry control element for reporting a power headroom, in accordance with some embodiments of the present disclosure.

DETAILED DESCRIPTION OF EXEMPLARY EMBODIMENTS

Figure 1:
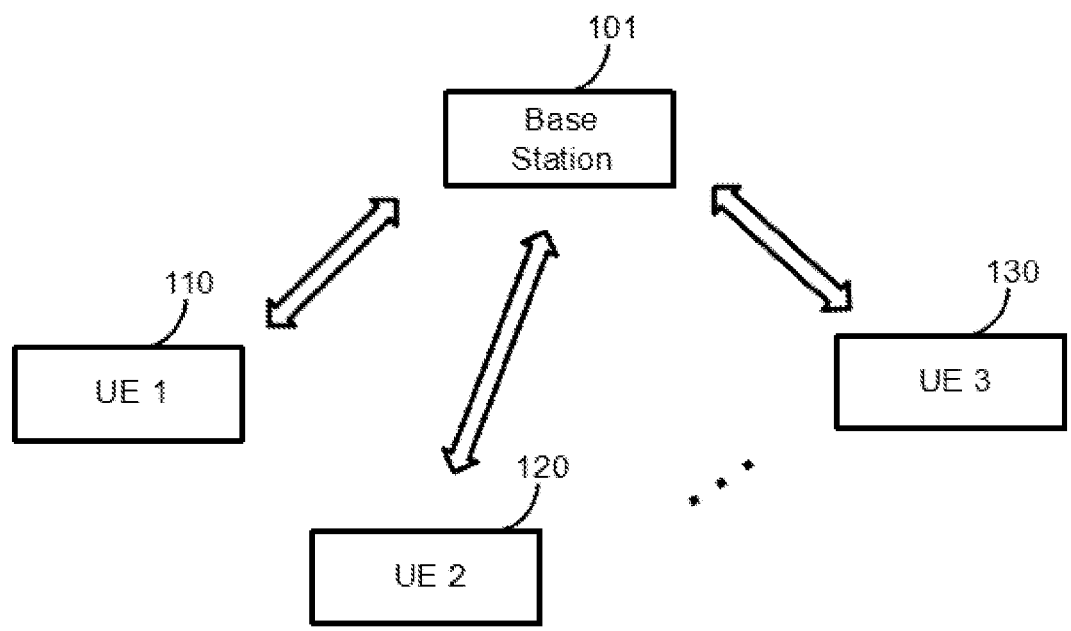
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. According to a configuration of the BS, a UE may send a power headroom report (PHR) to the BS. There are three types of the PH: Type 1 PH, Type 2 PH and Type 3 PH. Type 1 PH and Type 2 PH are calculated based on physical uplink shared channel (PUSCH) and/or physical uplink control channel (PUCCH) respectively, without considering sounding reference signal (SRS). Type 3 PH is calculated based on sounding reference signal (SRS) and can be applied to a subframe without PUSCH/PUCCH transmission. Each of the three types of PH is performed at cell level. The UE will calculate the PH on each cell independently. For a UE supporting multiple cells, once a PHR is triggered in a certain cell, the UE will report the PHR for all or multiple of activated cells to the base station. For an activated cell, a Type 1 PHR or Type 3 PHR will be sent. For a cell that can send PUCCH, it will also feed back Type 2 PHR. For any type of PHR, if the UE calculates the PHR according to the real-time information of an actual uplink transmission such as the power control parameters and occupied resources of the uplink transmission, such calculated PHR is called actual PHR. If the UE calculates the PHR according to a predefined or pre-configured power control parameters of a reference uplink transmission format, such calculated PHR is called virtual PHR. Throughout the present disclosure, the terms "PH" and "PHR" may be used interchangeably.

A 5G NR system supports two types of the PHRs: Type 1 PHR and Type 3 PHR. Depending on whether the PHR is calculated based on an actual transmission, the PHR may be actual or virtual. A UE or terminal can feed back the PHR to the base station in a PHR medium access control (MAC) control element (CE). If the terminal does not support multiple cells, the terminal feeds back the PHR of a single cell in a Single Entry PHR MAC CE. If the terminal supports multiple cells, the terminal feeds back the PHR to the base station in a Multiple Entry PHR MAC CE.

Different PHRs may be calculated for different application scenarios of a terminal. For a PHR fed back by the terminal to the base station, the present teaching discloses methods for the base station to know the PHR corresponds to which application scenario or application type. By using the methods disclosed in the present teaching, the system can effectively support PHR feedback of multiple application types; the base station can accurately know which application type the received PHR corresponds to. In addition, while the system supports PHR feedbacks corresponding to multiple application types, it can also control the feedback overhead based on the disclosed methods.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. Each UE may transmit uplink data to the BS 101 with a transmission power set between 0 and a maximum transmission power. For an uplink transmission, the UE may determine a power headroom (PH) report representing remaining power margin at the UE, and report the PHR to the BS.

Figure 2:
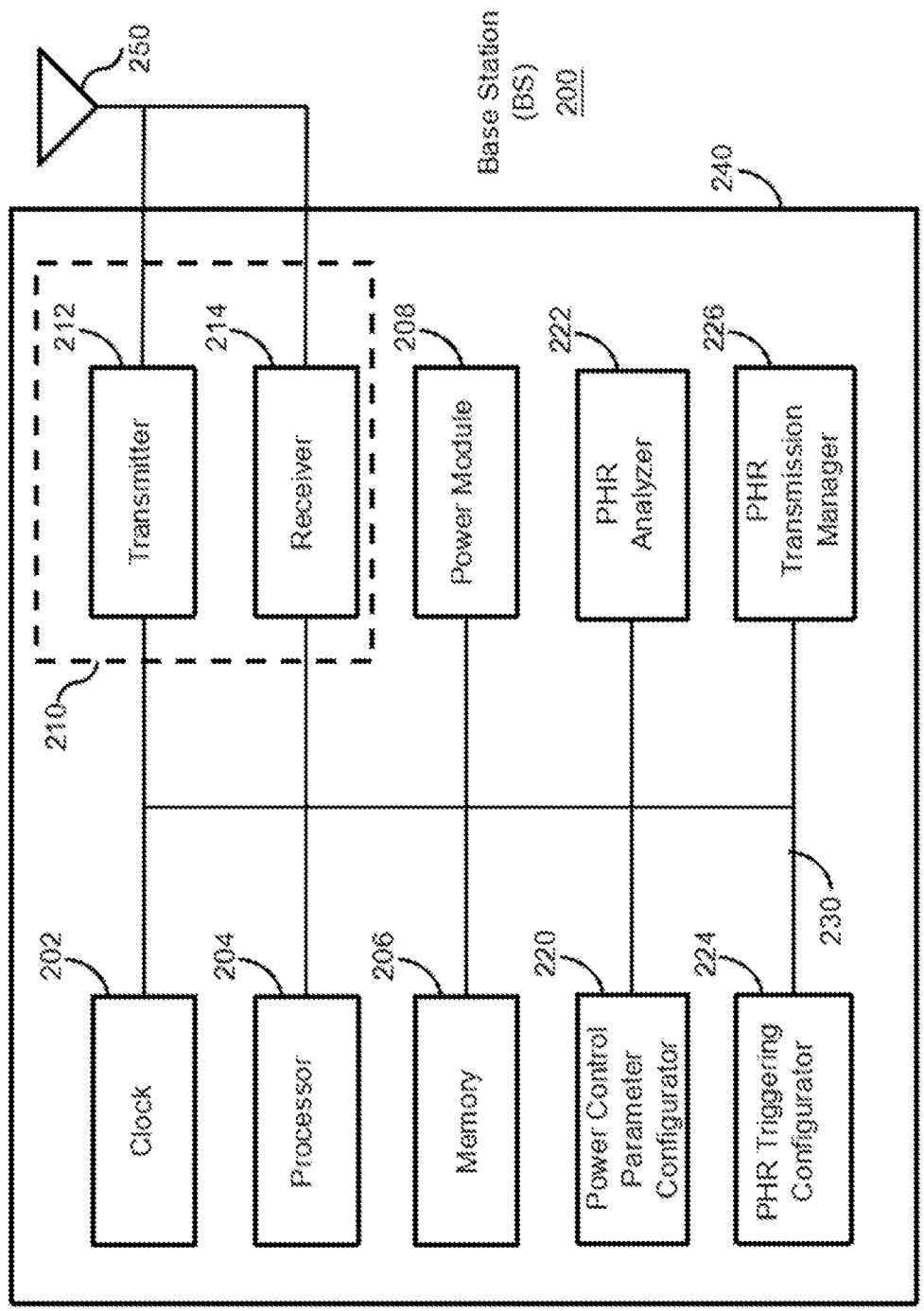
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a power control parameter configurator 220, a PHR analyzer 222, a PHR triggering configurator 224, and a PHR transmission manager 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may receive an uplink transmission from a UE, wherein the uplink transmission is performed based on a transmission power related to power control parameters. For example, the power control parameter configurator 220 in this example may determine a plurality of candidate configurations for at least one power control parameter for a UE. The plurality of candidate configurations correspond to different application types of uplink transmissions respectively.

In one embodiment, the configuration of the at least one power control parameter is determined based on a semi-static configuration by the BS 200 or based on a system pre-definition. In another embodiment, the configuration of the at least one power control parameter is determined based on an application type corresponding to a PUSCH carrying the PHR. In yet another embodiment, the configuration of the at least one power control parameter is determined based on whether the PHR is an actual PHR or a virtual PHR. In a different embodiment, the configuration of the at least one power control parameter is determined based on: an ending time or a receiving time of a downlink control information (DCI) for scheduling an uplink transmission, for example a PUSCH; a predetermined number of time units before a starting symbol of a configured grant uplink transmission, for example a configured grant PUSCH; whether each uplink transmission overlaps at least partially with a target uplink transmission carrying the PHR; whether each uplink transmission overlaps at least partially with a time unit where the target uplink transmission carrying the PHR is located; a transmission time for each uplink transmission; and/or an application type associated with each uplink transmission.

The PHR analyzer 222 in this example may receive, via the receiver 214 from the UE, a PHR MAC CE comprising one or multiple reports of a PHR associated with one or multiple uplink transmissions from the UE. The PHR is determined based on a configuration among the plurality of candidate configurations. In one embodiment, the PHR MAC CE comprises at least one indication indicating the configuration of the at least one power control parameter and/or an application type corresponding to the configuration. The at least one indication may be represented by at least one bit in the PHR MAC CE.

The PHR triggering configurator 224 in this example can configure triggering parameters and/or conditions for the PHR feedback from the UE. In one embodiment, a plurality of triggering conditions is configured for a plurality of application types respectively. The PHR is generated in response to a triggering of one of the plurality of triggering conditions corresponding to an application type of the uplink transmission. For example, the PHR may be generated based on: the application type is a default application type, the application type is an application type having a highest priority among the plurality of application types, the PHR is an only actual PHR among PHRs of the plurality of application types, the application type is a default application type among application types with actual PHRs in the plurality of application types, and/or the application type is an application type having a highest priority among application types with actual PHRs in the plurality of application types. The default application type can be configured semi-statically by the wireless communication node or based on a system pre-definition. The priorities of application types can be configured semi-statically by the wireless communication node or based on a system pre-definition.

The PHR transmission manager 226 in this example can manage PHR transmission and feedback at the UE, e.g. by configuring at least one condition for the UE to determine whether to transmit an entirety of a PHR MAC CE to the wireless communication node. A PHR MAC CE may comprise a PHR and/or a maximum transmission power associated with the uplink transmission.

In one embodiment, the UE may determine not to transmit the PHR MAC CE, when the at least one condition is related to: a time period after a latest PHR MAC CE is transmitted; and/or a cell that is associated with the uplink transmission and determined based on a semi-static configuration by the BS 200 or based on a system pre-definition. In another embodiment, the UE may determine not to transmit a maximum transmission power in the PHR MAC CE, when the at least one condition is related to: an application type of the uplink transmission according to a semi-static configuration by the BS 200 or a system pre-definition; an open-loop power control parameter candidate set for calculating the PHR; a closed-loop value mapping table for calculating the PHR; and/or a time period after transmitting a latest PHR MAC CE containing a maximum transmission power. In yet another embodiment, the UE may determine to differentially transmit the PHR and/or the maximum transmission power, when the at least one condition is related to: an application type of the uplink transmission according to a semi-static configuration by the BS 200 or a system pre-definition; an open-loop power control parameter candidate set for calculating the PHR; a closed-loop value mapping table for calculating the PHR; and/or a time period after transmitting a latest PHR MAC CE.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the power control parameter configurator 220. Conversely, each of the modules illustrated in FIG. 2 can be implemented using a plurality of separate components or elements.

Figure 3:
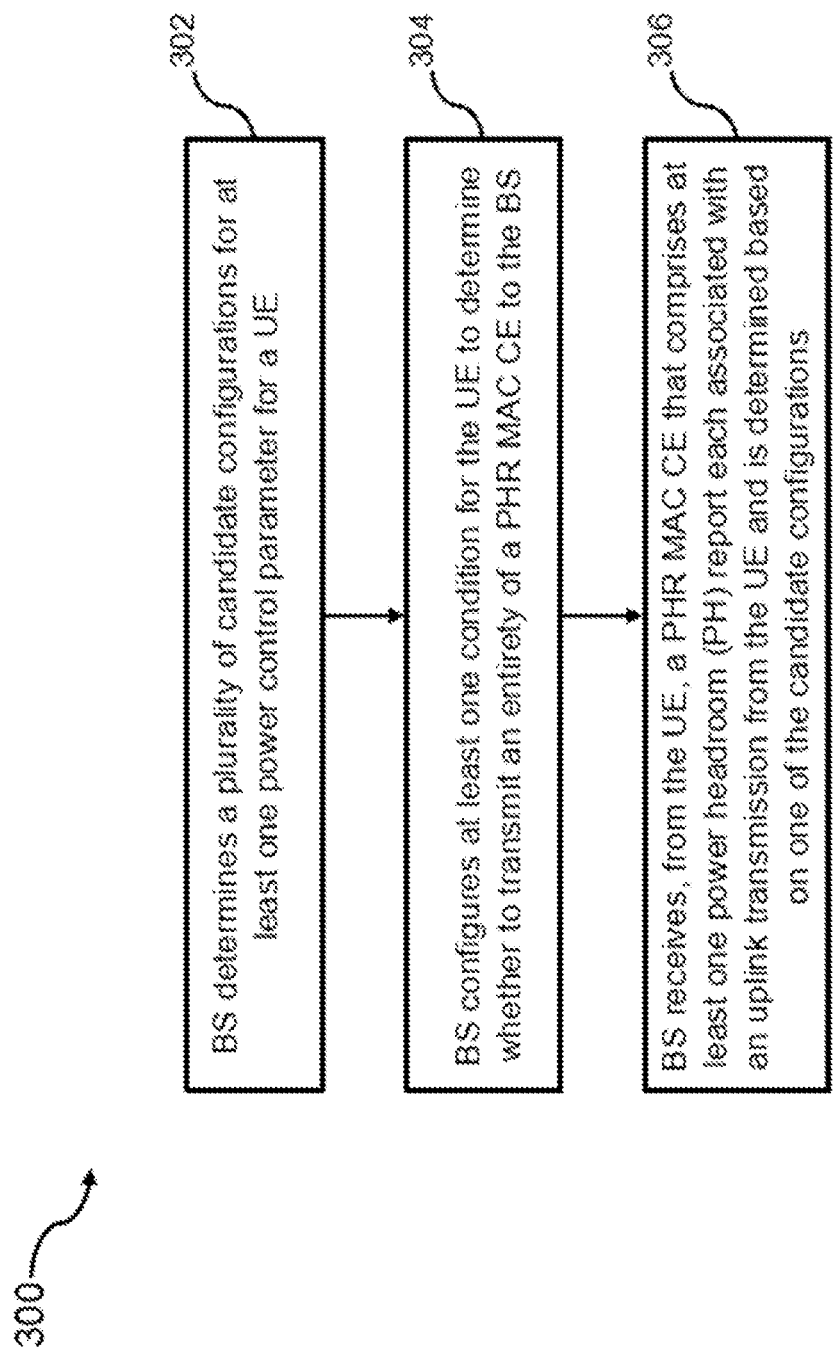
FIG. 3 illustrates a flow chart for a method performed by a BS for uplink data transmission, in accordance with some embodiments of the present disclosure.

FIG. 3 illustrates a flow chart for a method 300 performed by a BS, e.g. the BS 200 in FIG. 2, for uplink data transmission, in accordance with some embodiments of the present disclosure. At operation 302, the BS determines a plurality of candidate configurations for at least one power control parameter for a UE. At operation 304, the BS configures at least one condition for the UE to determine whether to transmit an entirety of a PHR MAC CE to the BS. At operation 306, the BS receives, from the UE, a PHR MAC CE that comprises at least one power headroom (PH) report each associated with an uplink transmission from the UE and is determined based on one of the candidate configurations. The order of the steps shown in FIG. 3 may be changed according to different embodiments of the present disclosure.

Figure 4:
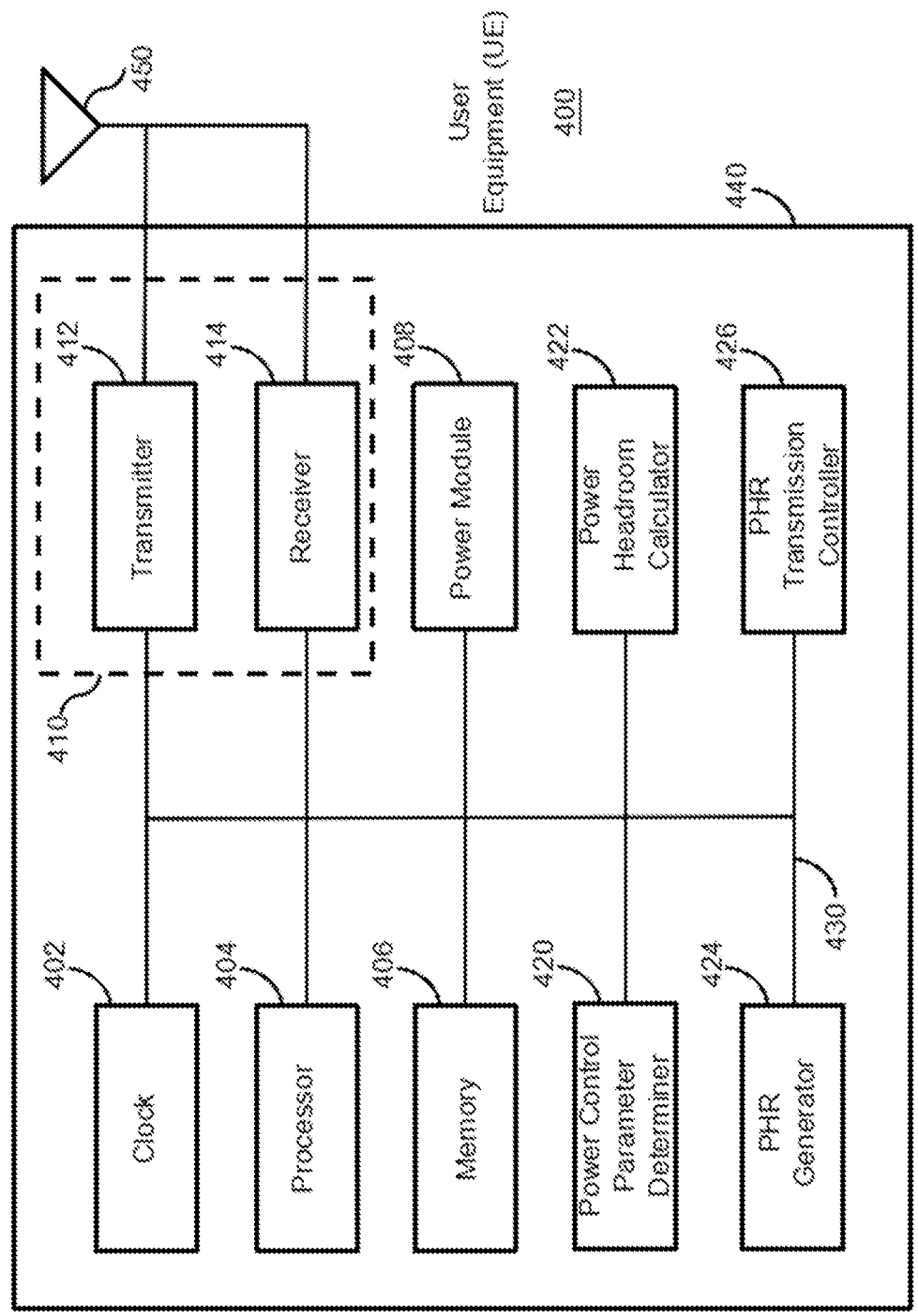
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a power control parameter determiner 420, a power headroom calculator 422, a PHR generator 424, and a PHR transmission controller 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The power control parameter determiner 420 in this example may determine a configuration of at least one power control parameter from a plurality of candidate configurations. The plurality of candidate configurations correspond to different application types of uplink transmissions respectively.

In one embodiment, the configuration of the at least one power control parameter is determined based on a semi-static configuration by a BS or based on a system pre-definition. In another embodiment, the configuration of the at least one power control parameter is determined based on an application type corresponding to an uplink transmission carrying the PHR, for example a physical uplink shared channel (PUSCH). In a different embodiment, the configuration of the at least one power control parameter is determined based on whether the PHR is an actual PHR or a virtual PHR. In another embodiment, the configuration of the at least one power control parameter is determined based on: an ending time of a downlink control information (DCI) for scheduling an uplink transmission, for example a PUSCH; a predetermined number of time units before a starting symbol of a configured grant uplink transmission, for example a configured grant PUSCH; whether each uplink transmission overlaps at least partially with a target uplink transmission carrying the PHR; whether each uplink transmission overlaps at least partially with a time unit where the target uplink transmission carrying the PHR is located; a transmission time for each uplink transmission; and/or an application type associated with each uplink transmission. The power headroom calculator 422 in this example may determine, based on the configuration of the at least one power control parameter, a PHR associated with an uplink transmission from the UE 400 to the BS.

The PHR generator 424 in this example may generate a PHR MAC CE for reporting the PHR to the BS. In one embodiment, the PHR MAC CE comprises at least one indication indicating the configuration of the at least one power control parameter and/or an application type corresponding to the configuration. The at least one indication may be represented by at least one bit in a control element comprising the PHR MAC CE, for example at least one reserved bit.

In one embodiment, a plurality of triggering conditions is configured for a plurality of application types respectively. The PHR generator 424 generates the PHR MAC CE in response to a triggering of one of the plurality of triggering conditions corresponding to an application type of the uplink transmission. The PHR MAC CE may be generated based on: the application type is a default application type, the application type is an application type having a highest priority among the plurality of application types, the PHR MAC CE including only actual PHRs among PHRs of the plurality of application types, the application type is a default application type among application types with actual PHRs in the plurality of application types, and/or the application type is an application type having a highest priority among application types with actual PHRs in the plurality of application types.

The PHR transmission controller 426 in this example can control the PHR transmission and feedback of the UE 400, e.g. by determining whether to transmit an entirety of a PHR MAC CE to the BS. A PHR MAC CE may comprise a report of a PHR and/or a maximum transmission power associated with the uplink transmission.

In one embodiment, the PHR transmission controller 426 may determine not to transmit the PHR MAC CE based on: a time period after a latest PHR MAC CE is transmitted; and/or a cell that is associated with the uplink transmission and determined based on a semi-static configuration by the BS or based on a system pre-definition. In another embodiment, the PHR transmission controller 426 may determine not to transmit a maximum transmission power in the PHR MAC CE based on: an application type of the uplink transmission according to a semi-static configuration by the BS or a system pre-definition; an open-loop power control parameter candidate set for calculating the PHR; a closed-loop value mapping table for calculating the PHR; and/or a time period after transmitting a latest PHR MAC CE containing a maximum transmission power. In yet another embodiment, the PHR transmission controller 426 may determine to differentially transmit the PHR and/or the maximum transmission power, based on: an application type of the uplink transmission according to a semi-static configuration by the BS or a system pre-definition; an open-loop power control parameter candidate set for calculating the PHR; a closed-loop value mapping table for calculating the PHR; and/or a time period after transmitting a latest PHR MAC CE.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the power headroom calculator 422. Conversely, each of the modules illustrated in FIG. 4 can be implemented using a plurality of separate components or elements.

Figure 5:
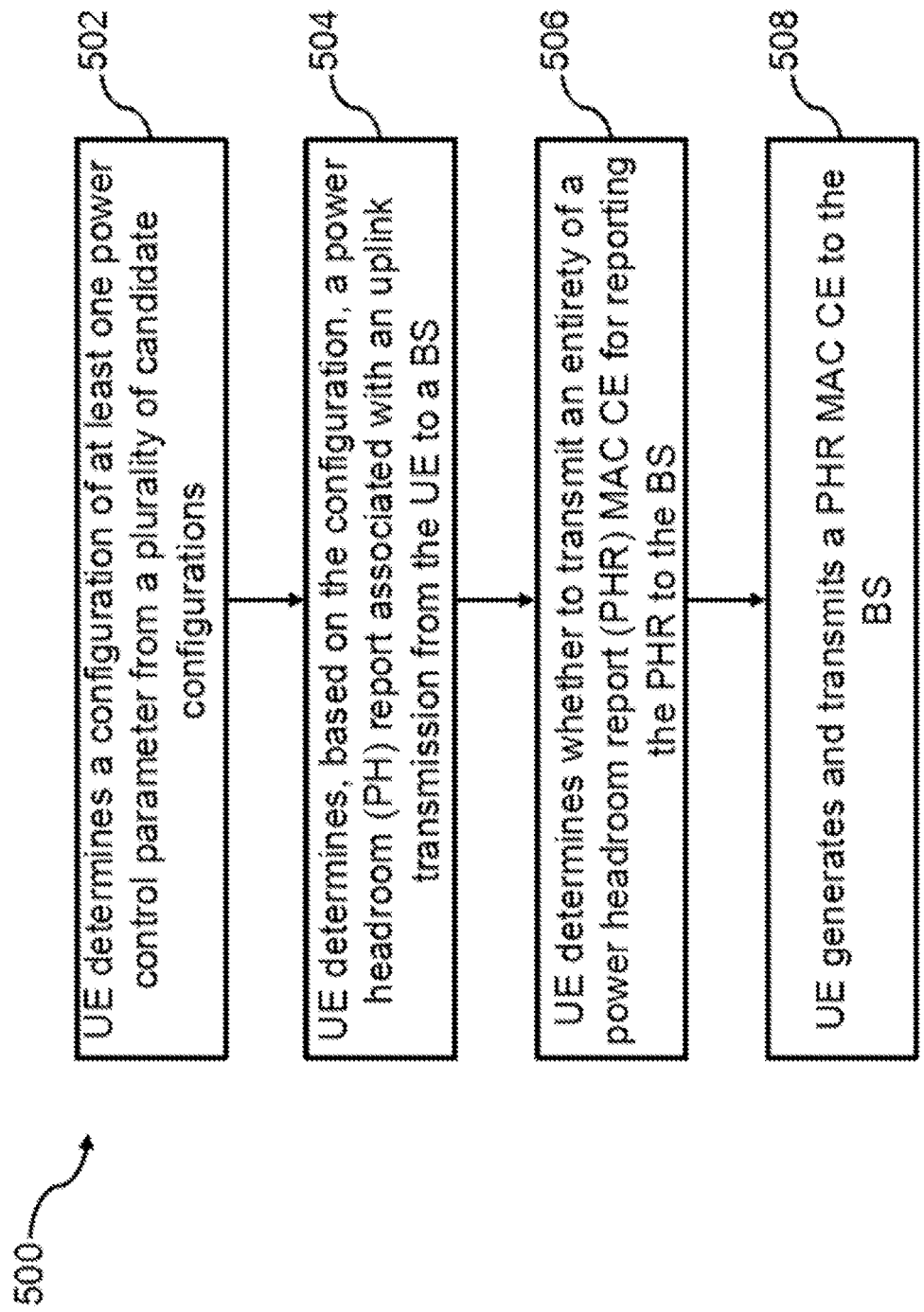
FIG. 5 illustrates a flow chart for a method performed by a UE for determining a power headroom, in accordance with some embodiments of the present disclosure.

FIG. 5 illustrates a flow chart for a method 500 performed by a UE, e.g. the UE 400 in FIG. 4, for determining a power headroom, in accordance with some embodiments of the present disclosure. At operation 502, the UE determines a configuration of at least one power control parameter from a plurality of candidate configurations. The UE determines at operation 504, based on the configuration, a power headroom (PH) report associated with an uplink transmission from the UE to a BS. At operation 506, the UE determines whether to transmit an entirety of a power headroom report (PHR) MAC CE for reporting the PHR to the BS. At operation 508, the UE generates and transmits a PHR MAC CE to the BS. The order of the steps shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, a base station configures a set of PHR trigger parameters for a terminal. The set of PHR triggering parameters comprises at least one of the following: a PHR cycle timer, a PHR prohibit timer, a path loss variation threshold, whether a feedback of Type 2 PHR is needed for another cell group (CG), whether a feedback of multiple PHRs is needed, etc.

If the terminal supports multiple application types or service types, for example, both eMBB and URLLC, the base station can configure the set of PHR trigger parameters for the terminal according to a maximum demand of different application types. In the present disclosure, "application types" and "service types" will be used interchangeably.

Based on a system pre-definition or a semi-static configuration from the base station for the terminal, different application types may correspond to different power control parameter value ranges or value rules respectively. The power control parameters include at least one of the following: open loop power control parameters, closed loop power control parameters, and path loss measurement reference signal. As such, if the terminal wants to calculate the PHR for application type 1, the PHR may be calculated based on the power control parameter value ranges or value rules corresponding to the application type 1; and if the terminal wants to calculate the PHR for application type 2, the PHR may be calculated based on the power control parameter value ranges or value rules corresponding to the application type 2. For example, the application type 1 may be eMBB, and the application type 2 may be URLLC.

In order to enable the base station to know which application type the PHR fed back by the terminal corresponds to, one of the following methods may be used.

A first method is to use one or more reserved bits to indicate the application type corresponding to the PHR. One or more of the reserved bits in a PHR MAC CE can be utilized to indicate an application type corresponding to the PHR. For example, if one reserved bit is used for indication, then the reserved bit set to "1" indicates that the PHR corresponds to application type 1; and the reserved bit set to "0" indicates that the PHR corresponds to application type 2. Each of the application types 1 and 2 can be one of URLLC, eMBB, or other applications.

When the terminal feeds back the PHRs of multiple cells, a Multiple Entry PHR MAC CE is used for the feedback of PHRs. For a PHR having an actual nature, this Multiple Entry PHR MAC CE will include the maximum transmit power of the UE used in calculating the actual PHR on the carrier. For a PH having a virtual nature, this Multiple Entry PHR MAC CE will not include the maximum transmit power of the UE used in calculating the virtual PHR on the carrier. According to the format of the Multiple Entry PHR MAC CE, there are reserved bits between the actual PH field and the field of the maximum transmit power of the UE on the carrier. As such, it is possible that the value ranges or value rules of the power control parameters used for calculating the virtual PHR are the same for different application types. In this case, for the virtual PHR, the UE does not need to indicate the application type corresponding to the PHR to the base station. When calculating the actual PHR, the value ranges or value rules of the power control parameters used for calculating the actual PHR are different for different application types. The UE can use a reserved bit between the actual PH field and the field of the maximum transmit power of the UE on the carrier to indicate whether the actual PHR corresponds to application type 1 or application type 2. Specific examples are given in FIG. 6 and FIG. 7 below.

Figure 6:
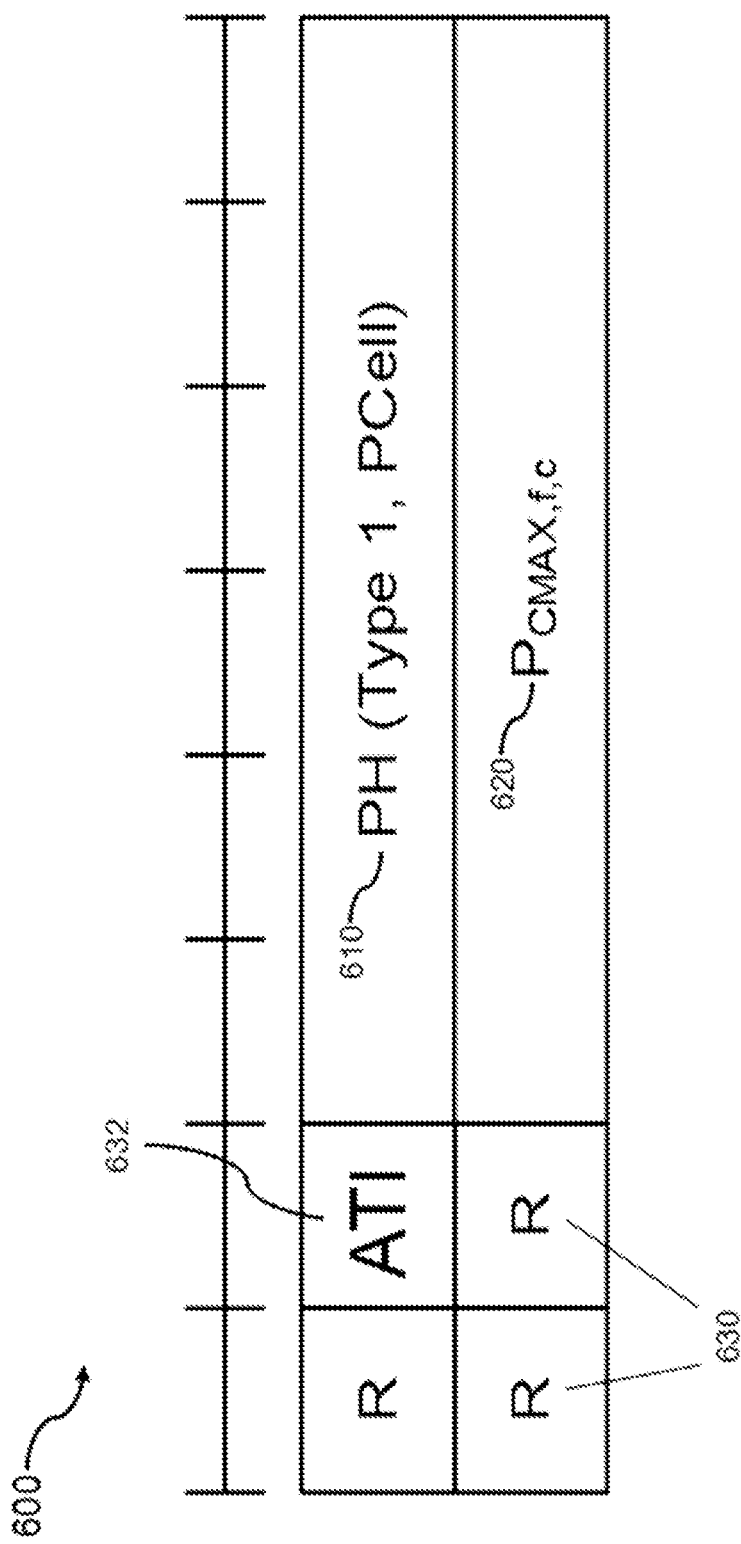
FIG. 6 illustrates an exemplary structure of a single entry control element for reporting a power headroom, in accordance with some embodiments of the present disclosure.

In the example shown in FIG. 6, the UE only supports a single uplink cell. As such, the UE sends the PHR feedback in a Single Entry PHR MAC CE 600 to the base station. The Single Entry PHR MAC CE 600 has four reserved bits 630, in addition to the fields of PH 610 and its corresponding maximum transmit power on the carrier $P_{CMAX,f,c}$ 620. One or more of the reserved bits 630 can be used as a field for application type indication (ATI) 632.

Figure 7:
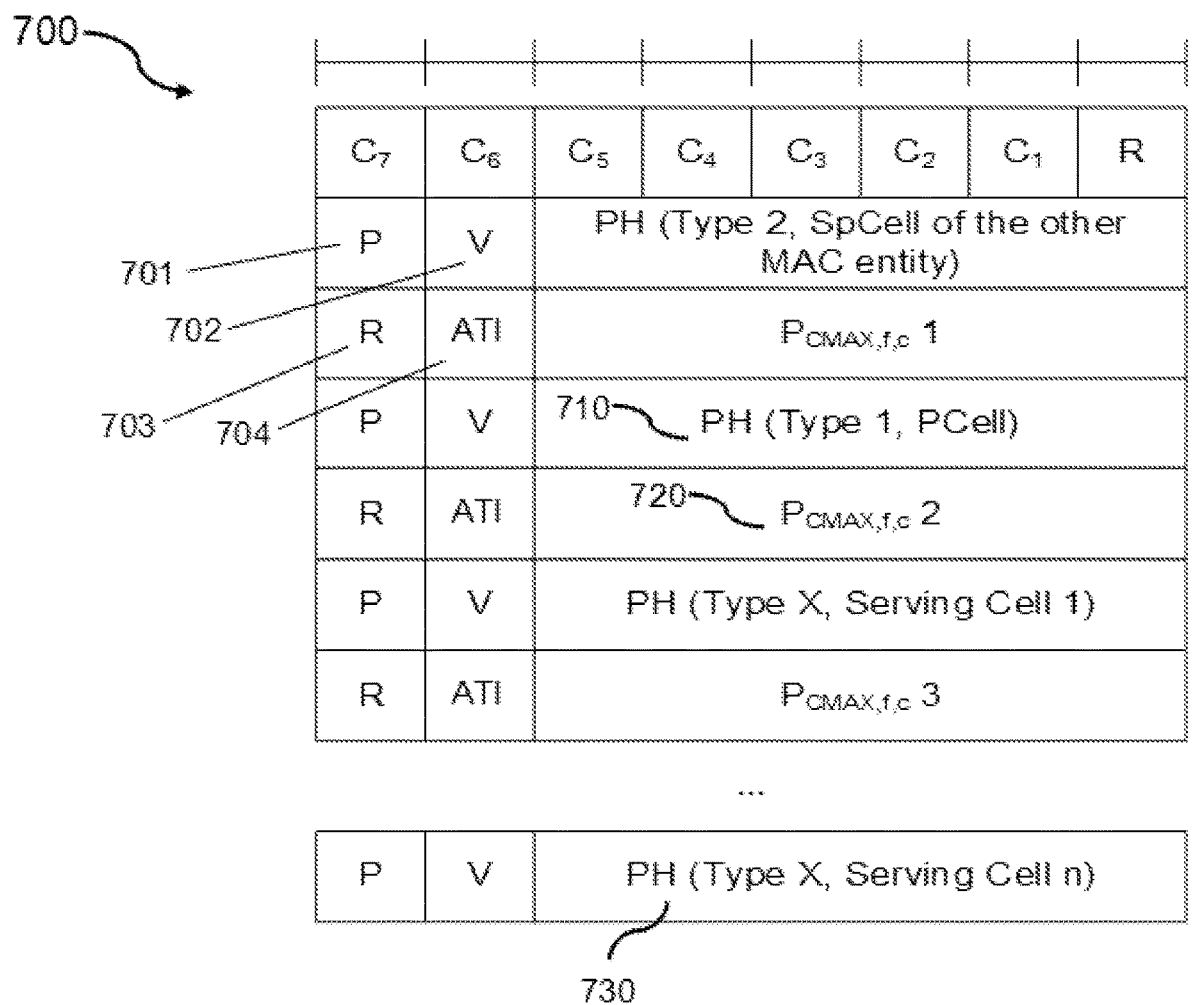
FIG. 7 illustrates an exemplary structure of a multiple entry control element for reporting a power headroom, in accordance with some embodiments of the present disclosure.

In the example shown in FIG. 7, the UE supports multiple uplink cells. The UE feeds back n PHRs in the Multiple Entry PHR MAC CE 700. In this example, the first (n−1) PHRs are actual PHRs, so that the UE's maximum transmit power on the cell $P_{CMAX,f,c}$ is also fed back for each of these (n−1) PHRs. The last PHR is a virtual PHR, so that the UE's maximum transmit power on the cell $P_{CMAX,f,c}$ is not fed back for the last PH field 730. For each of the first (n−1) PHRs, there are two reserved bits 703, 704 between fields of PH 710 and its corresponding $P_{CMAX,f,c}$ 720. One or both of these two reserved bits may be used as a field for application type indication (ATI) 704, to indicate an application type corresponding to the actual PHR. For each of the PHRs in FIG. 7, a P field 701 indicates whether the MAC entity utilizes power management maximum power reduction for serving the cell (P-MPRc); a V field 702 indicates whether the corresponding PHR is an actual PHR or a virtual PHR. V=0 represents an actual PHR; and V=1 represents a virtual PHR. As such, only when V=0, $P_{CMAX,f,c}$ is fed back. That is, ATI is fed back only for an actual PHR. The PHR is fed back in the PH field of the PHR MAC CE.

One or more existing bit fields in a PHR MAC CE can also be used to additionally indicate the application type.

In addition, if the virtual PHR does not have the corresponding "application type indication" field, then the virtual PHR calculation for different application types needs to be performed in a manner to ensure that for a certain power control parameter, the terminal adopts the same candidate value set or value mapping table. When the virtual PHR is calculated, the candidate value set or the value mapping table used by the terminal for a certain power control parameter can be determined based on a semi-static configuration by the base station or a system pre-definition. The certain power control parameter may be open loop power control parameters or closed loop power control parameters. For example, based on a semi-static configuration by the base station or a system pre-definition, when calculating the actual PHR of the application type 1, the candidate value set 1 is used for the open loop power control parameter $\{P_O, \alpha\}$, and the value mapping table 1 is used for the closed loop power control parameter TPC (transmission power control). Based on a semi-static configuration by the base station or a system pre-definition, when calculating the actual PHR of the application type 2, the candidate value set 2 is used for the open loop power control parameter $\{P_O, \alpha\}$, and the value mapping table 2 is used for the closed loop power control parameter TPC. Based on a semi-static configuration by the base station or a system pre-definition, when calculating the virtual PHR of the application type 1 or the application type 2, a first value in the candidate value set 1 is used for the open loop power control parameter $\{P_O, \alpha\}$; and a first value in the value mapping table 1 is used for the closed loop power control parameter TPC.

A second method is to use a reserved bit to indicate the value range or value rule of the power control parameters used when calculating the PHR. When the terminal calculates the PHR of a certain cell, a basic formula is show below:

PH=the maximum transmit power of the UE on the carrier−open loop power adjustment−closed loop power adjustment—other power adjustments, wherein the open loop power adjustment related to parameters $P_O$, $\alpha$, and PL, PL is the path loss value measured in accordance with the path loss measurement reference signal. For the value of $P_O$, one or more candidate value sets can be determined for the terminal based on a semi-static configuration by the base station or a system pre-definition. For the value of $\alpha$, one or more candidate value sets can be determined for the terminal based on a semi-static configuration by the base station or a system pre-definition. Here, PH equals PHR.

The amount of the closed-loop power control adjustment can be determined according to the TPC value indicated by the DCI. The mapping table of the TPC value and the power adjustment value may be determined for the terminal based on a semi-static configuration by the base station or a system pre-definition. For this mapping table (hereinafter "TPC value mapping table"), one or more TPC value mapping tables may be defined for the terminal based on a semi-static configuration by the base station or a system pre-definition.

Therefore, at least one of the following power control parameters may be determined based on a semi-static configuration by the base station or a system pre-definition: one or more candidate value sets for $P_O$; one or more candidate value sets for $\alpha$; one or more candidate value sets for $\{P_O, \alpha\}$; one or more measurement reference signals for measuring PL; one or more TPC value mapping tables.

When the UE calculates the PHR for different application types, it needs to take the value in the above power control parameters. In order to inform the base station which power control parameter is utilized to calculate a certain power control adjustment, when feeding back the PHR, the UE may indicate in the PHR MAC CE the power control parameter referred to in the calculation of a certain power control adjustment. This indication is referred to as a power control parameter indication, which is based on at least one of the following manners: using one or more reserved bits in the PHR MAC CE to indicate which candidate value set of $P_O$ is used for calculating the open loop power adjustment; using one or more reserved bits in the PHR MAC CE to indicate which candidate value set of $\alpha$ is used for calculating the open loop power adjustment; using one or more reserved bits in the PHR MAC CE to indicate which candidate value set of $\{P_O, \alpha\}$ is used for calculating the open loop power adjustment; using one or more reserved bits in the PHR MAC CE to indicate which measurement reference signal for measuring PL is used for calculating the open loop power adjustment; using one or more reserved bits in the PHR MAC CE to indicate which TPC value mapping table is used for calculating the closed loop power adjustment; or using one or more reserved bits in the PHR MAC CE to indicate any combination of the above manners.

Figure 8:
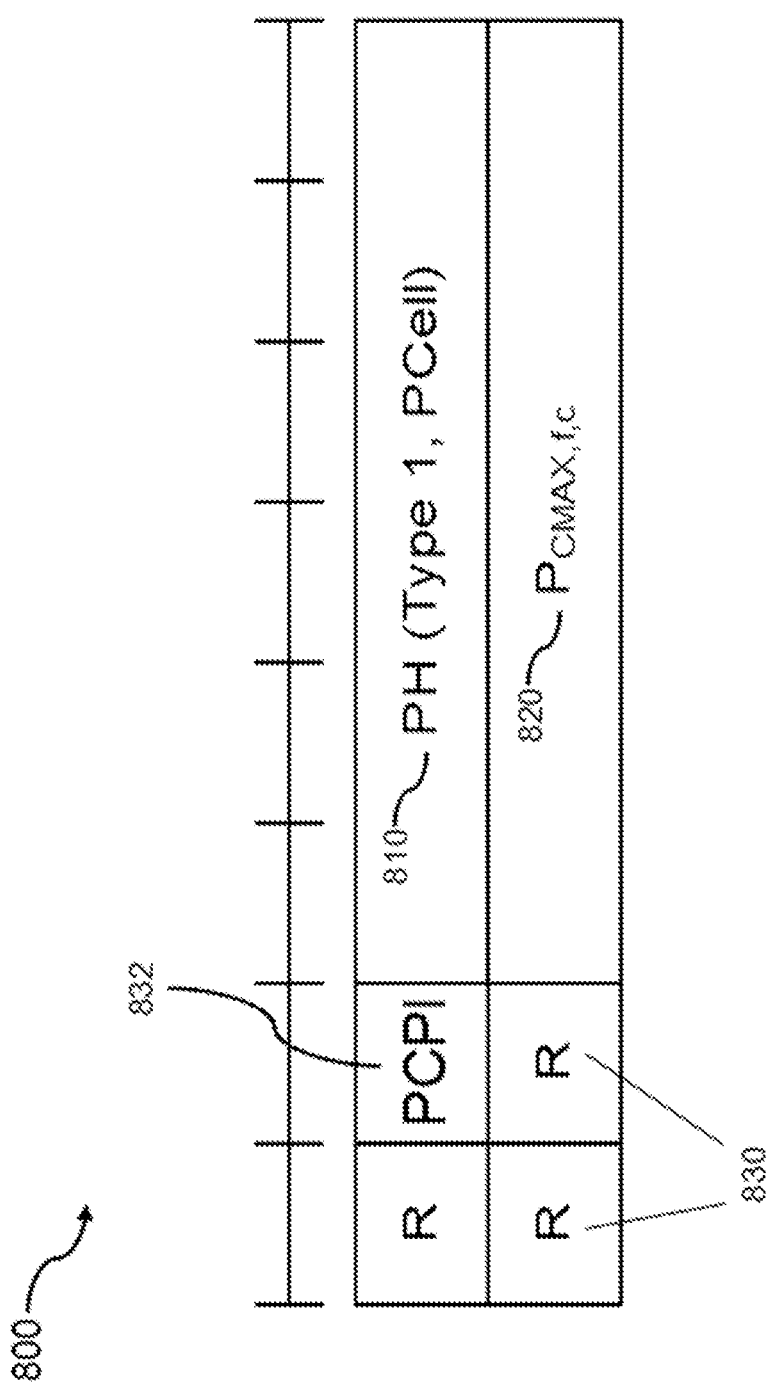
FIG. 8 illustrates another exemplary structure of a single entry control element for reporting a power headroom, in accordance with some embodiments of the present disclosure.

Specific examples are given in FIG. 8, FIG. 9, and FIG. 10, respectively. In FIG. 8, a "power control parameter indication" (PCPI) field 832 of the reserved bits 830 in a Single Entry PHR MAC CE 800 is used to indicate any of the above power control parameters. In FIG. 9, a PCPI field 912 in a Multiple Entry PHR MAC CE 900 is used to indicate any of the above power control parameters for each corresponding PH field 910. In FIG. 10, a plurality of PCPI fields 1013, 1014 in a Multiple Entry PHR MAC CE 1000 are used to indicate multiple parameters of the above power control parameters for each corresponding PH field 1010.

Similar to the first method, a "power control parameter indication" field may be indicated for all PHRs in the PHR MAC CE, or merely the actual PHRs in the PHR MAC CE. The existing bit fields in the PHR MAC CE can also be used to additionally indicate the power control parameters. The base station may receive a PHR corresponding to an application type, or a PHR corresponding to one candidate value set of power control parameter. If the base station knows a relationship between the values of the power control parameters corresponding to different application types, or a value relationship between different power control parameters, the base station can derive the PH values in other application types or corresponding to other power control parameters.

A second embodiment also includes two methods: method 2-1 and method 2-2. Method 2-1 is for the base station to semi-statically configure the application type corresponding to the PHR. Different types of applications may be supported by different terminals. For example, terminal 1 only supports application type 1; terminal 2 only supports application type 2; and terminal 3 supports both application type 1 and application type 2. Therefore, the base station can semi-statically configure the application type for the feedback of PHR from the terminal.

If the base station configures that a terminal needs to feed back the PHR for the application type 1, the terminal calculates the PHR only based on the power control parameter configuration of the application type 1.

If the base station configures that a terminal needs to feed back the PHR for the application type 2, the terminal calculates the PHR only based on the power control parameter configuration of the application type 2.

If the base station configures that a terminal can feed back the PHR for either the application type 1 or the application type 2, the PHR fed back by the terminal may be calculated based on either the power control parameter configuration of the application type 1 or the power control parameter configuration of the application type 2. For these terminals, the method in the first embodiment may be used to indicate the application type or the power control parameter corresponding to the PHR in the PHR MAC CE.

For a terminal supporting multiple uplink cells, different application types may be supported on different cells. For example, the terminal supports application type 1 on Cell 1, supports application type 2 on Cell 2, and supports both application type 1 and application type 2 on Cell 3. The base station can semi-statically configure that a terminal should feed back a PHR corresponding to which application type for a certain cell.

If the base station configures the terminal to feed back the PHR of the application type 1 regarding Cell 1, the terminal calculates the PHR of Cell 1 according to the configuration of the power control parameter of the application type 1.

If the base station configures the terminal to feed back the PHR of the application type 2 regarding Cell 2, the terminal calculates the PHR of Cell 2 according to the configuration of the power control parameter of the application type 2.

If the base station configures the terminal to feed back the PHR of the application type 1 and the application type 2 regarding Cell 3, the PHR fed back by the terminal regarding Cell 3 may be calculated based on either the power control parameter configuration of the application type 1 or the power control parameter configuration of the application type 2. The terminal may use the method in the first embodiment to indicate the application type or the power control parameter corresponding to the PHR in the PHR MAC CE fed back for Cell 3.

Method 2-2 is for the base station to semi-statically configure the power control parameters corresponding to the PHR. Based on a semi-static configuration by the base station or a system pre-definition, at least one of the following power control parameters can be configured: one or more candidate value sets for $P_O$; one or more candidate value sets for $\alpha$; one or more candidate value sets for $\{P_O, \alpha\}$; one or more measurement reference signals for measuring PL; one or more TPC value mapping tables.

For a certain power control parameter, if there are multiple candidate value sets or value mapping tables, the base station may semi-statically configure for the terminal that: for the power control parameter, which candidate set or value mapping table may be used. The calculation of the PHR is determined once it is determined that which candidate value set or value mapping table is adapted to the power control parameter.

For example, for the open loop power control parameter $\{P_O, \alpha\}$, there are two candidate value sets, which are set1 and set2 respectively. Based on semi-static configurations of the base station, values of $\{P_O, \alpha\}$ of the terminal 1 are chosen from set1, and values of $\{P_O, \alpha\}$ of the terminal 2 are chosen from set2.

For example, for a closed loop power control parameter TPC, there are two TPC value mapping tables, which are table1 and table2 respectively. Based on semi-static configurations of the base station, the terminal station 1 uses table1, so that after receiving the TPC indication in the DCI, the terminal 1 determines the current closed loop power control adjustment amount indicated by the TPC indication according to table1. Based on semi-static configurations of the base station, the terminal station 2 uses table2, so that after receiving the TPC indication in the DCI, the terminal 2 determines the current closed loop power control adjustment amount indicated by the TPC indication according to table2.

For example, for the path loss PL that needs to be used in the open loop power control adjustment, multiple reference signals can be used for the measurement of the path loss. The base station may semi-statically configure terminal 1 to use one of the reference signals to measure the path loss PL.

If for a certain power control parameter, a plurality of candidate value sets or candidate value mapping tables are supported by a terminal based on a semi-static configuration by the base station or a system pre-definition, then the terminal may feed back a PHR indicating that: the current PHR is calculated based on which value set or which value mapping table. The indication may be based on methods in the first embodiment.

For a terminal that supports multiple cells, the base station can semi-statically configure for a certain cell that: when calculating the PHR, the terminal should use which candidate value set or value mapping table for each power control parameter.

For example, for the open loop power control parameter $\{P_O, \alpha\}$, there are two candidate value sets, which are set1 and set2 respectively. Based on semi-static configurations of the base station, the terminal 1 calculates PHR of Cell1 based on values of $\{P_O, \alpha\}$ chosen from set1, and calculates PHR of Cell2 based on values of $\{P_O, \alpha\}$ chosen from set2.

For example, for the closed loop power control parameter TPC, there are two TPC value mapping tables, which are table1 and table2 respectively. Based on semi-static configurations of the base station, the terminal 1 calculates PHR of Cell1 based on table1, and calculates PHR of Cell2 based on table2. After receiving the TPC indication in the DCI, the terminal calculates the PHR of the Cell1 by determining the closed-loop power control adjustment amount indicated by the current TPC according to the table1, and calculates the PHR of the Cell2 by determining the closed-loop power control adjustment amount indicated by the current TPC according to the table2.

In a third embodiment, a set of rules is pre-defined to determine a feedback of PHR of which application type. This comprises two methods: method 3-1 and method 3-2.

In method 3-1, the base station configures a set of PHR trigger parameters for a terminal. The set of PHR trigger parameters comprises at least one of the following: a PHR cycle timer, a PHR prohibit timer, a path loss variation threshold, whether a feedback of Type 2 PHR is needed for another cell group (CG), whether a feedback of multiple PHRs is needed, etc.

If the terminal supports multiple application types, for example, both eMBB and URLLC, the base station can configure the set of PHR trigger parameters for the terminal according to the maximum demand of different application types. When the terminal feeds back the PHR, it may determine, according to at least one of the following rules, a PHR of which application type corresponds to a certain Cell.

According to Rule 1, the terminal determines the application type of the PHR according to the type of PUSCH carrying the PHR. If PUSCH carrying the PHR is a PUSCH with the application type 1, e.g. eMBB PUSCH, then all the PHRs carried in the PUSCH are PHRs corresponding to the application type 1; if PUSCH carrying the PHR is a PUSCH with the application type 2, e.g. URLLC PUSCH, then all the PHRs carried in the PUSCH are PHRs corresponding to the application type 2.

According to Rule 2, the terminal determines the application type of the PHR according to an actual PHR priority principle. The terminal calculates the PHR for multiple application types and then gives priority to the actual PHR. If an actual PHR is calculated for the application type 1, and a virtual PHR is calculated for the application type 2, the PHR of the application type 1 is fed back to the base station. If a virtual PHR is calculated for the application type 1, and an actual PHR is calculated for the application type 2, the PHR of the application type 2 is fed back to the base station. If an actual PHR is calculated for each of the application type 1 and the application type 2, a PHR with a default application type is fed back to the base station. If a virtual PHR is calculated for each of the application type 1 and the application type 2, a PHR with a default application type is fed back to the base station. Under Rule 2, one of the application types is pre-determined to be a default application type based on a semi-static configuration by the base station or a system pre-definition.

Figure 11:
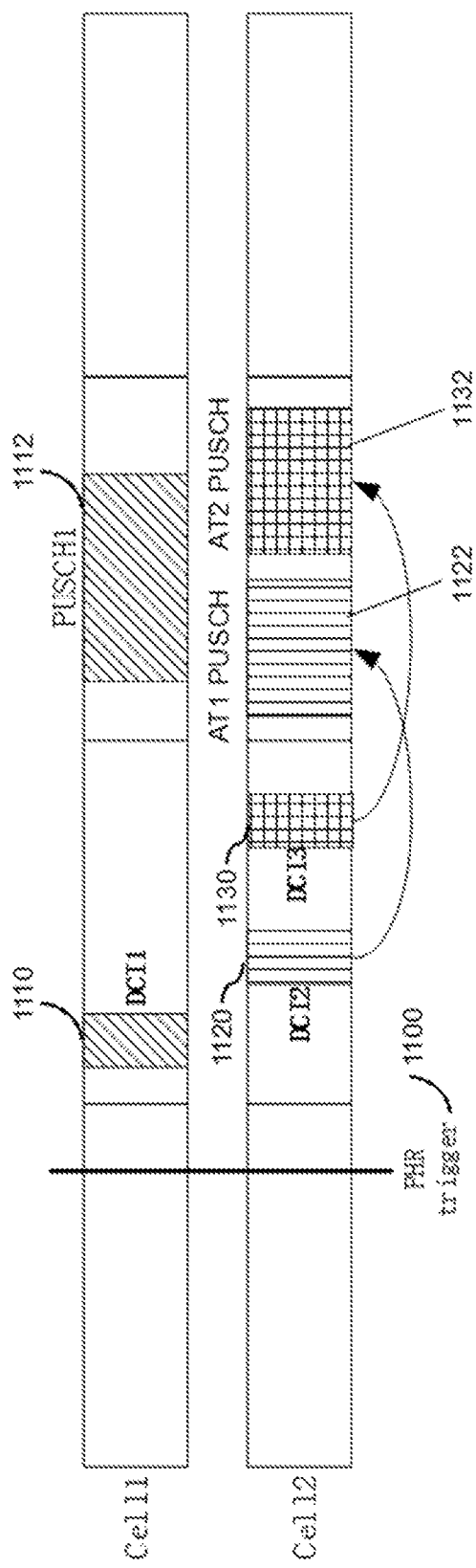
FIG. 11 illustrates an exemplary method for determining an application type corresponding to a PHR, in accordance with some embodiments of the present disclosure.

According to Rule 3, the terminal determines the application type of the PHR according to a DCI time priority principle. If the first DCI received by the terminal after triggering PHR is for scheduling a transmission of an application type, the terminal provides a feedback of the PHR corresponding to the application type. As shown in FIG. 11, after the PHR is triggered at 1100, the terminal determines to feed back PHR on PUSCH1 1112 scheduled by DCI1 1110 at Cell1. The terminal supports multiple cells. There are both an application type 1 service and an application type 2 service on Cell2. DCI2 1120 schedules application type 1 PUSCH (AT1 PUSCH) 1122; and DCI3 1130 schedules application type 2 PUSCH (AT2 PUSCH) 1132. After the PHR is triggered at 1100, the terminal first receives the DCI2 1120 before receiving the DCI3 1130. As such, for Cell2, the terminal feeds back the PH corresponding to application type 1.

DCI2 and DCI3 may also be received before the PHR is triggered, or one of the two is received before the PHR is triggered, and the other is received after the PHR is triggered. The terminal determines an order of receiving the DCI2 and DCI3, to determine PHR corresponding to which application type should be fed back for the Cell.

Figure 12:
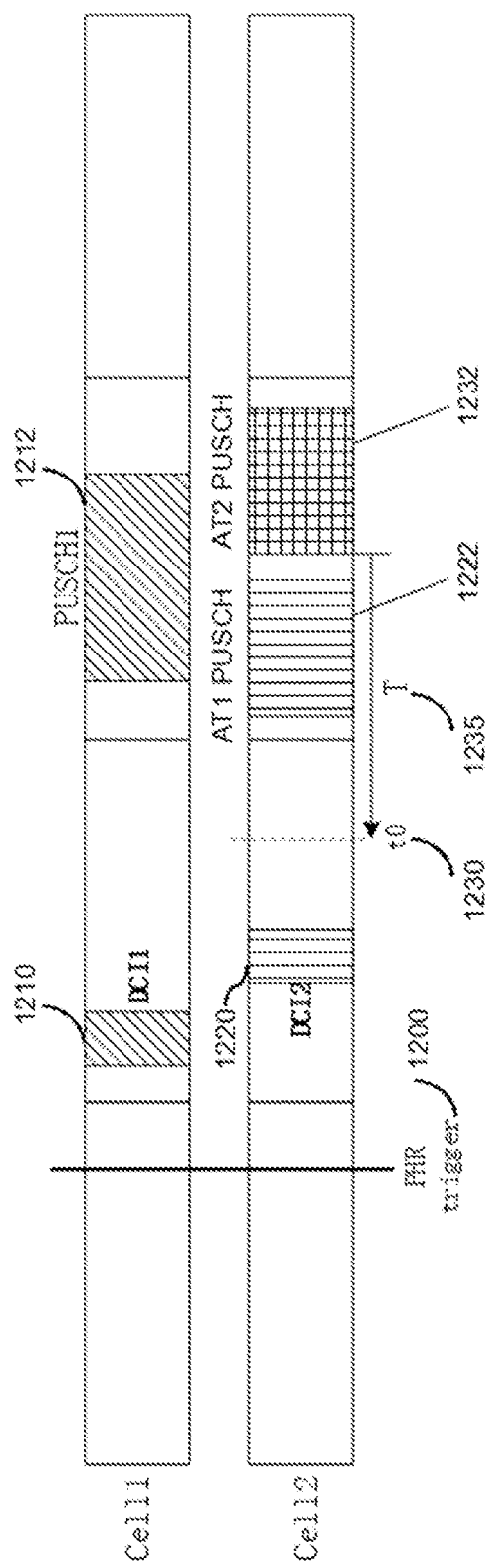
FIG. 12 illustrates another exemplary method for determining an application type corresponding to a PHR, in accordance with some embodiments of the present disclosure.

A PUSCH corresponding to a certain application type may be a configured grant PUSCH. There is no DCI scheduling the configured grant PUSCH. The terminal transmits the PUSCH according to time-frequency resources semi-statically configured by the base station. As shown in FIG. 12, PUSCH1 1212 is scheduled by DCI1 1210; and AT1 PUSCH 1222 is scheduled by DCI2 1220. Each of PUSCH1 1212 and AT1 PUSCH 1222 is a PUSCH scheduled by grant. In contrast, the AT2 PUSCH 1232 is a configured grant PUSCH, without DCI scheduling. For such PUSCH 1232, T time units 1235 may be pushed backward to the past from the starting symbol of the PUSCH 1232 to obtain a t0 time point 1230. The time unit is a symbol, a slot, a mini-slot, or a sub-frame. The value of the T may be N2, or a minimum of K2. Here, N2 is $T_{proc,2}^{max}$ as discussed below, and K2 are the scheduling delays between the scheduling DCI and the PDSCH, or between the scheduling DCI and the PUSCH scheduled by the DCI, the values of K2 are based on a semi-static configuration by the base station or a system pre-definition.

Based on a comparison of the ending symbol of DCI2 1220 received by the terminal and the t0 time point 1230, the terminal determines which time point is earlier. The terminal feeds back the PHR of the application type corresponding to the PUSCH with an earlier time point. In FIG. 12, the DCI2 reception time is earlier than t0, so that for Cell2, the terminal will feed back the PHR corresponding to application type 1 for the Cell.

According to Rule 4, the terminal determines the application type of the PHR according to a PUSCH time priority principle. A PUSCH carrying PHR is treated as a target PUSCH. For a Cell supporting PUSCH with a plurality of application types, in accordance with the application type corresponding to a PUSCH have an overlap with the target PUSCH, the terminal determines that the PHR fed back for the Cell is a PHR corresponding to which application type.

If PUSCHs of a plurality of application types on the Cell are overlapping with the target PUSCH, the application type is determined based on the first overlapping PUSCH. A PHR having an application type corresponding to the first PUSCH overlapping with the target PUSCH is fed back. As shown in FIG. 11, for Cell2, the application type 1 PUSCH 1122 and the application type 2 PUSCH 1132 both overlap with the PUSCH1 1112 carrying the PHR. Because the application type 1 PUSCH 1122 is the first overlapping PUSCH among the two PUSCHs, the terminal feeds back the PHR corresponding to application type 1 for Cell2.

Alternatively, a target time unit is defined as the time unit in which the PUSCH carrying the PHR is located, where the time unit may be a symbol cluster, a mini-slot, a slot, a subframe, etc. For a cell that supports PUSCHs of multiple application types, according to the application type corresponding to the PUSCH that overlaps with the target time unit, it is determined that the PHR fed back for the Cell is a PHR corresponding to which application type. If PUSCHs of a plurality of application types on the Cell are overlapping with the target time unit, the application type is determined based on the first overlapping PUSCH. A PHR having an application type corresponding to the first PUSCH overlapping with the target time unit is fed back. The overlapping described herein may be partially overlapping or completely overlapping.

In method 3-2, based on a semi-static configuration by the base station or a system pre-definition, at least one of the following power control parameters can be configured: one or more candidate value sets for $P_O$; one or more candidate value sets for $\alpha$; one or more candidate value sets for $\{P_O, \alpha\}$; one or more measurement reference signals for measuring PL; one or more TPC value mapping tables.

For a certain power control parameter, there may be multiple candidate value sets or value mapping tables, and different candidate value sets or value mapping tables correspond to different application types. Then, the terminal determines, according to at least one of the following rules, which candidate value set or value mapping table is used for the power control parameter. Once a candidate value set or a value mapping table is determined for the power control parameter, the calculation of the PHR is determined.

When feeding back the PHR for a Cell, the terminal can determine to feedback the PHR calculated based on which candidate value set or value mapping table for the power control parameter, according to at least one of the following rules.

According to Rule 1, the terminal determines the candidate value set or value mapping table of the PHR according to the type of PUSCH carrying the PHR. If PUSCH carrying the PHR is a PUSCH with the application type 1, e.g. eMBB PUSCH, then all the PHRs carried in the PHR MAC CE are PHRs calculated based on the power control parameter candidate value set or value mapping table corresponding to the application type 1; if PUSCH carrying the PHR is a PUSCH with the application type 2, e.g. URLLC PUSCH, then all the PHRs carried in the PHR MAC CE are PHRs calculated based on the power control parameter candidate value set or value mapping table corresponding to the application type 2.

According to Rule 2, the terminal determines the candidate value set or value mapping table of the PHR according to an actual PHR priority principle. The terminal calculates the PHR for multiple application types and then gives priority to the actual PHR. If an actual PHR is calculated for the application type 1, and a virtual PHR is calculated for the application type 2, the PHR calculated based on the power control parameter candidate value set or value mapping table corresponding to the application type 1 is fed back to the base station. If a virtual PHR is calculated for the application type 1, and an actual PHR is calculated for the application type 2, the PHR calculated based on the power control parameter candidate value set or value mapping table corresponding to the application type 2 is fed back to the base station. If an actual PHR is calculated for each of the application type 1 and the application type 2, a PHR calculated based on a default power control parameter candidate value set 1 or default value mapping table 1 is fed back to the base station. If a virtual PHR is calculated for each of the application type 1 and the application type 2, a PHR calculated based on a default power control parameter candidate value set 2 or default value mapping table 2 is fed back to the base station. Under Rule 2, the default candidate value set 1 or default value mapping table 1, and the default candidate value set 2 or default value mapping table 2 are pre-determined for a certain power control parameter based on a semi-static configuration by the base station or a system pre-definition. The default candidate value set 1 may be same as or different from the default candidate value set 2. The default value mapping table 1 may be same as or different from the default value mapping table 2.

According to Rule 3, the terminal determines the candidate value set or value mapping table of the PHR according to a DCI time priority principle for a Cell. If the first DCI received by the terminal after triggering PHR is for scheduling a transmission of an application type, the terminal provides a feedback of the PHR calculated based on the power control parameter's candidate value set or value mapping table corresponding to the application type. As shown in FIG. 11, after the PHR is triggered at 1100, the terminal determines to feed back PHR on PUSCH1 1112 scheduled by DCI1 1110 at Cell1. The terminal supports multiple cells. There are both an application type 1 service and an application type 2 service on Cell2. DCI2 1120 schedules application type 1 PUSCH (AT1 PUSCH) 1122; and DCI3 1130 schedules application type 2 PUSCH (AT2 PUSCH) 1132. After the PHR is triggered at 1100, the terminal first receives the DCI2 1120 before receiving the DCI3 1130. As such, for Cell2, the terminal feeds back the PHR calculated based on the power control parameter's candidate value set or value mapping table corresponding to the application type 1 for the Cell.

DCI2 and DCI3 may also be received before the PHR is triggered, or one of the two is received before the PHR is triggered, and the other is received after the PHR is triggered. The terminal determines an order of receiving the DCI2 and DCI3, to determine PHR calculated based on the power control parameter's which candidate value set or value mapping table should be fed back.

A PUSCH corresponding to a certain application type may be a configured grant PUSCH. There is no DCI scheduling the configured grant PUSCH. The terminal transmits the PUSCH according to time-frequency resources semi-statically configured by the base station. As shown in FIG. 12, PUSCH1 1212 is scheduled by DCI1 1210; and AT1 PUSCH 1222 is scheduled by DCI2 1220. Each of PUSCH1 1212 and AT1 PUSCH 1222 is a PUSCH scheduled by grant. In contrast, the AT2 PUSCH 1232 is a configured grant PUSCH, without DCI scheduling. For such PUSCH 1232, T time units 1235 may be pushed backward to the past from the starting symbol of the PUSCH 1232 to obtain a t0 time point 1230. The time unit is a symbol, a slot, a mini-slot, or a sub-frame. Based on a comparison of the ending symbol of DCI2 1220 received by the terminal and the t0 time point 1230, the terminal determines which time point is earlier. The terminal feeds back the PHR calculated based on the power control parameter's candidate value set or value mapping table corresponding to the PUSCH with an earlier time point. In FIG. 12, the DCI2 reception time is earlier than t0, so that for Cell2, the terminal will feed back the MR calculated based on the power control parameter's candidate value set or value mapping table corresponding to application type 1 and the AT1 PUSCH 1222.

The value of T 1235 can be determined according to any of the following manners.

In manner 3-1, the value of T may be equal to a time delay for the terminal to process the HARQ-ACK feedback corresponding to the PDSCH, with a specific value of: $T_{proc,1}^{max}$, where $T_{proc,1}^{max}=(N_1+d_{1,1}+1)\cdot(2048+144)\cdot\kappa\cdot2^{-\mu}\cdot T_C$. The variables involved in this formula have the following values. The value of N1 is related to terminal capability, PDSCH Numerology, uplink transmission Numerology, and DMRS time-frequency resource location. The value of $d_{1,1}$ is related to PDSCH mapping type, terminal capability, and PDSCH time domain length. The value of µ is related to the PDCCH Numerology, PDSCH Numerology, and uplink transmission Numerology. The time units $T_c=1/(\Delta f_{max}\cdot N_f)$, where $\Delta f_{max}=180\cdot10^3$ Hz and $N_f=4096$. The constant $\kappa=T_s/T_c=64$, where $T_s=1/(\Delta f_{ref}\cdot N_{f,ref})$, $\Delta f_{ref}=15\cdot10^3$ Hz and $N_{f,ref}=2048$.

In manner 3-2, the value of T may be related to a time delay for the terminal to process the HARQ-ACK feedback corresponding to the PDSCH, with a specific value of: $k*T_{proc,1}^{max}$, where $T_{proc,1}^{max}=(N_1+d_{1,1}+1)\cdot(2048+144)\cdot\kappa\cdot2^{-\mu}\cdot T_C$ as discussed above, and k is a constant of values like 0.5, 1, etc.

In manner 3-3, the value of T may be related to a time delay for the terminal to process the HARQ-ACK feedback corresponding to the PDSCH, with a specific value of: $(1/k)*T_{proc,1}^{max}$, where $T_{proc,1}^{max}=(N_1+d_{1,1}+1)\cdot(2048+144)\cdot\kappa\cdot2^{-\mu}\cdot T_C$ as discussed above, and k is an integer of values like 1, 2, 3, etc.

In manner 3-4, the value of T may be equal to a time delay for the terminal to process the HARQ-ACK feedback corresponding to the semi-persistent PDSCH release command, with a specific value of: $T_{proc,release}^{max}$, where $T_{proc,release}^{max}=(N+1)\cdot(2048+144)\cdot\kappa\cdot2^{-\mu}\cdot T_C$. The variables involved in this formula have the following values. The value of N is related to terminal capabilities and the PDCCH Numerology, while other parameters have been discussed above. For the UE processing capability 1 and for the SCS of the PDCCH reception, N=10 for 15 kHz, N=12 for 30 kHz, N=22 for 60 kHz, and N=25 for 120 kHz. For a UE with capability 2 and for the SCS of the PDCCH reception, N=5 for 15 kHz, N=5.5 for 30 kHz, and N=11 for 60 kHz.

In manner 3-5, the value of T may be related to a time delay for the terminal to process the HARQ-ACK feedback corresponding to the semi-persistent PDSCH release command, with a specific value of: $k*T_{proc,release}^{max}$, where $T_{proc,release}^{max}=(N+1)\cdot(2048+144)\cdot\kappa\cdot2^{-\mu}\cdot T_C$ as discussed above, and k is a constant of values like 0.5, 1, etc.

In manner 3-6, the value of T may be related to a time delay for the terminal to process the HARQ-ACK feedback corresponding to the semi-persistent PDSCH release command, with a specific value of: $(1/k)*T_{proc,release}^{max}$, where $T_{proc,release}^{max}=(N+1)\cdot(2048+144)\cdot\kappa\cdot2^{-\mu}\cdot T_C$ as discussed above, and k is an integer of values like 1, 2, 3, etc.

In manner 3-7, the value of T may be equal to a time delay for the terminal to process the PUSCH scheduled by the PDCCH, with a specific value of: $T_{proc,2}^{max}$, where $T_{proc,2}^{max}=\max((N_2+d_{2,1}+1)\cdot(2048+144)\cdot\kappa\cdot2^{-\mu}\cdot T_C, d_{2,2})$. The variables involved in this formula have the following values. The value of $N_2$ is related to terminal capability, PDCCH Numerology, and uplink transmission Numerology; $d_{2,1}=0$ or $d_{2,1}=1$; $d_{2,2}=0$ or $d_{2,2}$ is equal to the BWP conversion delay; while other parameters have been discussed above.

In manner 3-8, the value of T may be related to a time delay for the terminal to process the PUSCH scheduled by the PDCCH, with a specific value of: $k*T_{proc,2}^{max}$, where $T_{proc,2}^{max}=\max((N_2+d_{2,1}+1)\cdot(2048+144)\cdot\kappa\cdot2^{-\mu}\cdot T_C, d_{2,2})$, as discussed above, and k is a constant of values like 0.5, 1, etc.

In manner 3-9, the value of T may be related to a time delay for the terminal to process the PUSCH scheduled by the PDCCH, with a specific value of: $(1/k)*T_{proc,2}^{max}$, where $T_{proc,2}^{max}=\max((N_2+d_{2,1}+1)\cdot(2048+144)\cdot\kappa\cdot2^{-\mu}\cdot T_C, d_{2,2})$, as discussed above, and k is an integer of values like 1, 2, 3, etc.

In manner 3-10, the value of T may be equal to a time delay for the terminal to process the PUCCH or PUSCH including an aperiodic CSI feedback, with a specific value of: $T_{proc,CSI}^{max}$, where $T_{proc,CSI}^{max}=\max((Z+d)\cdot(2048+144)\cdot\kappa\cdot2^{-\mu}\cdot T_C, d_{2,2})$. The variables involved in this formula have the following values. The value of Z is related to the terminal capability, the number of updated CSI reports, etc.; d=2 or 3 or 4; while other parameters have been discussed above.

In manner 3-11, the value of T may be related to a time delay for the terminal to process the PUCCH or PUSCH including an aperiodic CSI feedback, with a specific value of: $k*T_{proc,CSI}^{max}$, where $T_{proc,CSI}^{max}=\max((Z+d)\cdot(2048+144)\cdot\kappa\cdot2^{-\mu}\cdot T_C, d_{2,2})$, as discussed above, and k is a constant of values like 0.5, 1, etc.

In manner 3-12, the value of T may be related to a time delay for the terminal to process the PUCCH or PUSCH including an aperiodic CSI feedback, with a specific value of: $(1/k)*T_{proc,CSI}^{max}$, where $T_{proc,CSI}^{max}=\max((Z+d)\cdot(2048+144)\cdot\kappa\cdot2^{-\mu}\cdot T_C, d_{2,2})$, as discussed above, and k is an integer of values like 1, 2, 3, etc.

According to Rule 4, the terminal determines the candidate value set or value mapping table of the PH according to a PUSCH time priority principle. A PUSCH carrying PHR is treated as a target PUSCH. For a Cell supporting PUSCH with a plurality of application types, in accordance with the application type corresponding to a PUSCH have an overlap with the target PUSCH, the terminal determines that the PH fed back for the Cell is a PH calculated based on the power control parameter's which candidate value set or value mapping table.

If PUSCHs of a plurality of application types on the Cell are overlapping with the target PUSCH, the power control parameter's candidate value set or value mapping table is determined based on the first overlapping PUSCH. A PH calculated based on the power control parameter's candidate value set or value mapping table corresponding to the first PUSCH overlapping with the target PUSCH is fed back. As shown in FIG. 11, for Cell2, the application type 1 PUSCH 1122 and the application type 2 PUSCH 1132 both overlap with the PUSCH1 1112 carrying the PHR. Because the application type 1 PUSCH 1122 is the first overlapping PUSCH among the two PUSCHs, the terminal feeds back the PH calculated based on the power control parameter's candidate value set or value mapping table corresponding to application type 1 for Cell2.

Alternatively, a target time unit is defined as the time unit in which the PUSCH carrying the PHR is located, where the time unit may be a symbol cluster, a mini-slot, a slot, a subframe, etc. For a cell that supports PUSCHs of multiple application types, according to the application type corresponding to the PUSCH that overlaps with the target time unit, it is determined that the PHR fed back for the Cell is a PHR calculated based on the power control parameter's which candidate value set or value mapping table. If PUSCHs of a plurality of application types on the Cell are overlapping with the target time unit, the power control parameter's candidate value set or value mapping table is determined based on the first overlapping PUSCH. A PHR calculated based on the power control parameter's candidate value set or value mapping table corresponding to the first PUSCH overlapping with the target time unit is fed back. The overlapping described herein may be partially overlapping or completely overlapping.

Separate PHR mechanisms may be applied for different application types. In a fourth embodiment, the base station configures one or more sets of PHR trigger parameters for the terminal. Each set of PHR trigger parameters specifically includes at least one of the following: a PHR cycle timer, a PHR prohibit timer, a path loss variation threshold, whether a feedback of Type 2 PHR is needed for another cell group (CG), whether a feedback of multiple PHRs is needed, etc.

Based on a semi-static configuration by the base station or a system pre-definition, application type 1 corresponds to a first set of PHR trigger parameters, and a first set of power control parameters for calculation of the PHR; application type 2 corresponds to a second set of PHR trigger parameters, and a second set of power control parameters for calculation of the PHR. Each set of the power control parameters includes at least one of the following: one or more candidate value sets for $P_O$; one or more candidate value sets for $\alpha$; one or more candidate value sets for $\{P_O, \alpha\}$; one or more measurement reference signals for measuring PL; one or more TPC value mapping tables.

At least one of the following modes can be used to determine a PHR is fed back on which PUSCH.

According to Mode 1, a PHR of a corresponding application type can only be fed back on a PUSCH with the corresponding application type. Once a PHR with a corresponding application type 1 is triggered, the terminal feeds back the one or multiple PHRs corresponding to the application type 1 for one or multiple Cells on the PUSCH with application type 1 of the Cell. Once a PHR with a corresponding application type 2 is triggered, the terminal feeds back the one or multiple PHRs corresponding to the application type 2 for one or multiple Cells on the PUSCH with application type 2 of the Cell. The multiple Cells can be all the Cells the terminal supports for uplink transmission.

According to Mode 2, a PHR of an application type can be fed back on a PUSCH with any application type. Once a PHR with a corresponding application type 1 is triggered, the terminal feeds back the one or multiple PHRs corresponding to the application type 1 for one or multiple Cells on a closest or first coming PUSCH of the Cell. The closest or first coming PUSCH may correspond to any application type. Once a PHR with a corresponding application type 2 is triggered, the terminal feeds back the one or multiple PHRs corresponding to the application type 2 for one or multiple Cells on a closest or first coming PUSCH of the Cell. The closest or first coming PUSCH may correspond to any application type. The multiple Cells can be all the Cells the terminal supports for uplink transmission.

According to Mode 3, for some application types, the PHR can only be fed back on the PUSCH of the corresponding application type; and for some application types, the PHR can be fed back on the PUSCH of any application type. In one example, for the PHR of the application type 1, once triggered, the terminal may feed back the PHR corresponding to the application type 1 of some or all of the Cells on the first coming PUSCH, and the PUSCH may be any application type. Application type 1 can be URLLC or eMBB or another application type. For the PHR of the application type 2, once triggered, the terminal may feed back the PHR corresponding to the application type 2 of some or all of the cells on the PUSCH corresponding to the application type 2. Application type 2 may be eMBB or other types of applications.

If two PHRs corresponding to application type 1 and application type 2 respectively are triggered at the same time, at least one of the following manners can be taken.

According to Manner 1, the terminal feeds back all of the PHRs corresponding to different application types. In this manner, the PHR MAC CE that the terminal feeds back to the base station may include multiple Type 1 PHRs for one cell. The terminal can use the reserved bits in the PHR MAC CE to indicate that multiple Type 1 PHRs are fed back for the Cell. The terminal will sequentially feed back PHR's and/or Pcmax's corresponding to multiple application types according to an order based on a semi-static configuration by the base station or a system pre-definition.

According to Manner 2, a default application type or a high-priority application type is determined based on a semi-static configuration by the base station or a system pre-definition. In this case, when two PHRs corresponding to application type 1 and application type 2 respectively are triggered at the same time, the terminal feeds back the PHR corresponding to the default application type or the high priority application type. For example, the base station semi-statically configures that URLLC is a high priority application type.

According to Manner 3, the terminal gives priority to the actual PHR for feedback. If there is only one application type whose PHR is an actual PHR, the terminal feeds back the actual PHR; if the PHRs of the two application types are both actual PHRs or both virtual PHRs, the terminal feeds back a PHR with a default application type or a high-priority application type, or the terminal feeds back both PHRs corresponding to the two application types. Then, the PHR MAC CE that the terminal feeds back to the base station may include multiple Type 1 PHRs for one cell. The terminal can use the reserved bits in the PHR MAC CE to indicate that multiple Type 1 PHRs are fed back for the Cell. The terminal will sequentially feed back PHR's and/or Pcmax's corresponding to multiple application types according to an order based on a semi-static configuration by the base station or a system pre-definition.

In a fifth embodiment, a method for reducing PHR feedback overhead is disclosed. A time window t1 is determined for the terminal based on a semi-static configuration by the base station or a system pre-definition. After the terminal feeds back the PHR corresponding to a certain application type for a Cell, the terminal does not feed back another PHR in the time window t1 for the Cell. This saves PHR feedback overhead. This method of saving PHR feedback overhead can be applied for both actual PHR and virtual PHR, or only for actual PHR, or only for virtual PHR.

After the PHR feedback is triggered, in some cases, for some cells, a differential feedback or no feedback of the PHR and/or Pcmax may be used to save the PHR feedback overhead.

If the terminal needs to feed back PHR for multiple application types, such as URLLC, eMBB, etc., or the terminal needs to calculate PHR based on multiple open-loop and/or closed-loop power control parameter candidate value sets, then for a Cell, the terminal does not need to feed back Pcmax when at least one of the following conditions is met based on a semi-static configuration by the base station or a system pre-definition: (a) for a PHR with a certain application type, there is no need to feed back Pcmax; (b) for a PHR calculated based on certain open-loop power control parameter candidate sets, there is no need to feed back Pcmax; (c) for a PHR calculated based on some closed-loop value mapping table, there is no need to feed back Pcmax; (d) in a time window T after the last feedback of the PHR containing Pcmax, the terminal does not need to feedback Pcmax again.

The terminal may differentially feed back PHR and/or Pcmax for a certain Cell according to a semi-static configuration by the base station or a system pre-definition when at least one of the following conditions is met: (a) for a PHR with a certain application type, the terminal differentially feeds back the PHR and/or Pcmax; (b) for a PHR calculated based on certain open-loop power control parameter candidate sets, the terminal differentially feeds back the PHR and/or Pcmax; (c) for a PHR calculated based on some closed-loop value mapping table, the terminal differentially feeds back the PHR and/or Pcmax; (d) in a time window T after the last feedback of the PHR corresponding to application type 1, if another PHR feedback corresponding to application type 2 is triggered at the terminal, the terminal differentially feeds back the PHR and/or Pcmax. Each of the application type 1 and the application type 2 may be URLLC, eMBB, etc.

Another way to reduce the PHR feedback overhead is not to feed back the PHR for some cells based on a semi-static configuration by the base station or a system pre-definition. For example, for a certain application type, the terminal does not need to feed back the PHR of the Secondary Cell, so that part or all of the field indicating the Cell in the PHR MAC CE can be omitted.

In the present application, the technical features in the various embodiments can be used in combination in one embodiment without conflict. Each embodiment is merely an exemplary embodiment of the present application.

In all of the above embodiments, the different "application types" mentioned may be at least one of the following: different service modes such as URLLC and eMBB, which are determined based on a semi-static configuration by the base station or a system pre-definition; different services according to dynamic indication of DCI, such as different DCI format indication, or different DCI size indication, or different RNTI indication scrambling DCI, or different DCI blind detection method indication, or a field indicated in the DCI; different candidate value sets corresponding to the open loop power control parameters; different reference signals for path loss measurement; different value mapping tables corresponding to the closed loop power control parameters.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, the method comprising:
determining a configuration of at least one power control parameter from a plurality of candidate configurations, wherein the plurality of candidate configurations correspond to a plurality of different application types of uplink transmissions respectively, the configuration corresponding to one of the plurality of different application types;
determining, based on the configuration of the at least one power control parameter, a power headroom report (PHR) associated with an uplink transmission from the wireless communication device to a wireless communication node; and
generating a power headroom report (PHR) medium access control (MAC) control element (CE) for reporting the PHR to the wireless communication node,
wherein a plurality of triggering conditions is configured for the plurality of different application types respectively, wherein one of the plurality of triggering conditions is a highest priority among the plurality of different application types, and
wherein the PHR MAC CE is generated in response to a triggering of the one of the plurality of different application types having the highest priority among the plurality of different application types.

2. The method of claim 1, wherein the PHR MAC CE comprises at least one indication indicating the configuration of the at least one power control parameter and/or an application type of the plurality of different application types corresponding to the configuration.

3. The method of claim 2, wherein:
the at least one indication is represented by at least one bit in a PHR MAC CE.

4. The method of claim 1, wherein the configuration of the at least one power control parameter is determined based on a semi-static configuration by the wireless communication node or based on a system pre-definition.

5. The method of claim 1, wherein the configuration of the at least one power control parameter is determined based on an application type of the plurality of different application types corresponding to a physical uplink shared channel (PUSCH) carrying the PHR.

6. The method of claim 1, wherein the configuration of the at least one power control parameter is determined based on whether the PHR is an actual PHR or a virtual PHR.

7. The method of claim 1, wherein the configuration of the at least one power control parameter is determined based on:
a time of receiving a downlink control information (DCI) for scheduling an uplink transmission;
a predetermined number of time units before a starting symbol of a configured grant uplink transmission;
whether each uplink transmission overlaps at least partially with a target PUSCH carrying the PHR;
whether each uplink transmission overlaps at least partially with a time unit where the target PUSCH carrying the PHR is located;
a transmission time for each uplink transmission; and/or
an application type associated with each uplink transmission.

8. The method of claim 1, wherein:
the plurality of triggering conditions configured for the plurality of different application types further comprises:
an application type is a default application type that is determined based on a semi-static configuration by the wireless communication node or based on a system pre-definition,
an application type has the highest priority among the plurality of different application types priority and priorities of the plurality of different application types are determined based on a semi-static configuration by the wireless communication node or based on a system pre-definition, the PHR is an only actual PHR among PHRs of the plurality of different application types, an application type is a default application type, which is among application types with actual PHRs in the plurality of different application types and is determined based on a semi-static configuration by the wireless communication node or based on a system pre-definition, and/or an application type has a highest priority among application types with actual PHRs in the plurality of different application types, wherein priorities of the plurality of different application types are determined based on a semi-static configuration by the wireless communication node or based on a system pre-definition.

9. A method performed by a wireless communication node, the method comprising:

determining a plurality of candidate configurations for at least one power control parameter for a wireless communication device, wherein the plurality of candidate configurations correspond to a plurality of different application types of uplink transmissions respectively, wherein at least two of the plurality of different application types have different priorities from each other; and receiving, from the wireless communication device, a power headroom report (PHR) medium access control (MAC) control element (CE) comprising a PHR associated with an uplink transmission from the wireless communication device, wherein the PHR is determined based on a configuration among the plurality of candidate configurations, wherein a plurality of triggering conditions is configured for a plurality of application types respectively, wherein one of the plurality of triggering conditions is a highest priority among the plurality of different application types, and wherein the PHR MAC CE is generated in response to a triggering of the one of the plurality of different application types having the highest priority among the plurality of different application types.

10. The method of claim 9, wherein the PHR MAC CE comprises at least one indication indicating the configuration of the at least one power control parameter and/or an application type of the plurality of different application types corresponding to the configuration.

11. The method of claim 10, wherein:
the at least one indication is represented by at least one bit in a PHR MAC CE.

12. The method of claim 9, wherein the configuration of the at least one power control parameter is determined based on a semi-static configuration by the wireless communication node or based on a system pre-definition.

13. The method of claim 9, wherein the configuration of the at least one power control parameter is determined based on an application type of the plurality of different application types corresponding to a physical uplink shared channel (PUSCH) carrying the PHR.

14. The method of claim 9, wherein the configuration of the at least one power control parameter is determined based on whether the PHR is an actual PHR or a virtual PHR.

15. The method of claim 9, wherein the configuration of the at least one power control parameter is determined based on:

a time of receiving a downlink control information (DCI) for scheduling an uplink transmission;

a predetermined number of time units before a starting symbol of a configured grant uplink transmission;

whether each uplink transmission overlaps at least partially with a target PUSCH carrying the PHR;

whether each uplink transmission overlaps at least partially with a time unit where the target PUSCH carrying the PHR is located;

a transmission time for each uplink transmission; and/or an application type associated with each uplink transmission.

16. A wireless communication device comprising:
a memory storing a plurality of instructions; and
a processor configured to execute the plurality of instructions, and upon execution of the plurality of instructions, is configured to:

determine a configuration of at least one power control parameter from a plurality of candidate configurations, wherein the plurality of candidate configurations correspond to a plurality of different application types of uplink transmissions respectively, the configuration corresponding to one of the plurality of different application types;

determine, based on the configuration of the at least one power control parameter, a power headroom report (PHR) associated with an uplink transmission from the wireless communication device to a wireless communication node; and generate a power headroom report (PHR) medium access control (MAC) control element (CE) for reporting the PHR to the wireless communication node, wherein a plurality of triggering conditions is configured for the plurality of different application types respectively, wherein one of the plurality of triggering conditions is a highest priority among the plurality of different application types, and wherein the PHR MAC CE is generated in response to a triggering of the one of the plurality of different application types having the highest priority among the plurality of different application types.

* * * * *